Figures 1, 6:
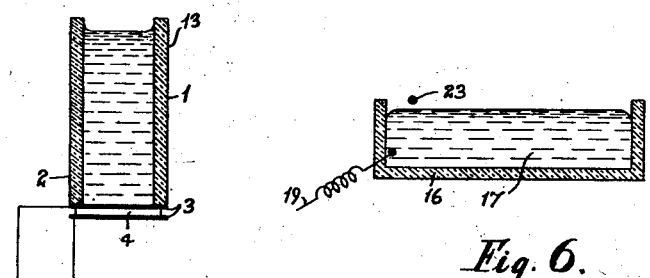

April 25, 1939.   J. H. JEFFREE   2,155,660
LIGHT MODULATING DEVICE
Filed Feb. 27, 1937   4 Sheets-Sheet 1

Inventor:
J. H. JEFFREE

April 25, 1939.  J. H. JEFFREE  2,155,660
LIGHT MODULATING DEVICE
Filed Feb. 27, 1937  4 Sheets-Sheet 2

Inventor:
J. H. JEFFREE

April 25, 1939.　　　J. H. JEFFREE　　　2,155,660
LIGHT MODULATING DEVICE
Filed Feb. 27, 1937　　4 Sheets-Sheet 3

Inventor:
J. H. JEFFREE

April 25, 1939.  J. H. JEFFREE  2,155,660
LIGHT MODULATING DEVICE
Filed Feb. 27, 1937   4 Sheets-Sheet 4

Inventor:
J. H. JEFFREE

Patented Apr. 25, 1939

2,155,660

UNITED STATES PATENT OFFICE 2,155,660

LIGHT MODULATING DEVICE

John Henry Jeffree, Oxshott, England, assignor to Scophony Limited, London, England, a company of Great Britain Application February 27, 1937, Serial No. 128,195
In Great Britain March 3, 1934

6 Claims. (Cl. 178—7.3)

This invention relates to systems for producing and utilising a modulated light beam in television and like systems.

The present invention utilises the known principle that when high frequency mechanical waves are caused to traverse a body forming part of an optical system, they bring about in general retardations and accelerations of the wave front of a beam of light passing through or reflected from the body, these retardations and accelerations corresponding to the regions of compression and rarefaction or of varying displacement of the body produced by the waves. Owing to the regular spacing of these regions, corresponding to the wavelength employed, there can be produced optical effects similar to those caused by a diffraction grating.

This may be explained as follows:

It is well known in optics that if light is thrown on to a diffraction grating consisting of a reflecting or transparent body on which there are formed a number of closely spaced ridges, or on which there are ruled a number of lines, some light is thrown or diffracted out of the path which the beam would take were there no ridges or lines, the angle of the diffracted beam to the main beam which maintains its normal direction being determined by the wavelength of the light and the closeness of the ridges or rulings.

If mechanical waves are caused to traverse a body, and light is thrown thereon, the waves are also capable of acting in the same way as the lines or ridges of a diffraction grating, to produce diffraction effects.

The present invention is based upon the following. Because some of the light is thrown out of the main beam by diffraction effects, the amount of light remaining in the main beam is reduced by an amount corresponding to the amount of the light diffracted. If the amplitude of the mechanical waves is sufficiently large, all the light may suffer diffraction, and the main beam becomes extinguished.

In a known arrangement for using this principle for the purposes of light modulation a parallel beam of light is passed through a cell having two opposite transparent walls, and filled with a transparent liquid. At the bottom of the cell is attached a piezo-electric crystal. High frequency electrical oscillations, modulated by the oscillations with which it is required to control the light beam are applied across opposite surfaces of the crystal, which vibrates in sympathy with these oscillations and sets up corresponding mechanical oscillations in the liquid in the cell. The light beam passing through the liquid becomes divided into a diffracted portion and a central beam maintaining its normal direction. The amount of light in the central beam will vary inversely in accordance with the amplitude of the mechanical waves in the liquid. An apertured screen is provided in the path of the light, and is arranged to allow the central beam to pass to a utilisation surface, and to arrest the diffracted light.

In a system of this kind, it is necessary that the width of the beam shall be less than the wavelength in the liquid of the cell of the highest modulation frequency. When the width of the beam is equal to the wavelength or to any integral multiple thereof, there is no modulation.

If high modulation frequencies are used (as is the case in television systems) it may be necessary to use a beam width which is only a fraction of a millimetre wide, thus severely restricting the amount of light available.

It is an object of the present invention to provide improved apparatus for television and the like reception in which the amount of light usefully available in the modulated light beam is substantially increased. It is a further object of the present invention to provide a television or like receiver in which a plurality of elemental areas of a picture can be reconstituted simultaneously from signals received along a single channel.

Other objects of the invention will appear from the following description and the appended claims.

Figure 2:
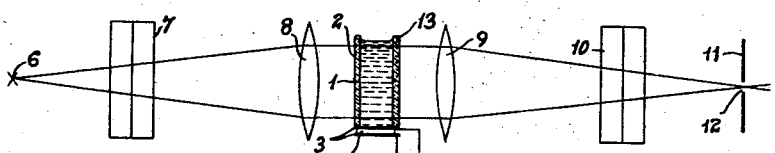
Figure 3:
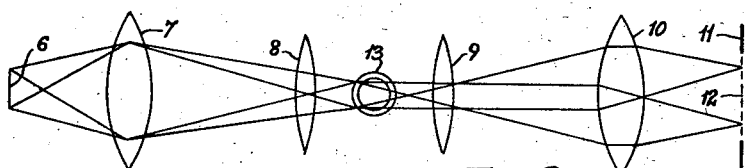
Figure 4:
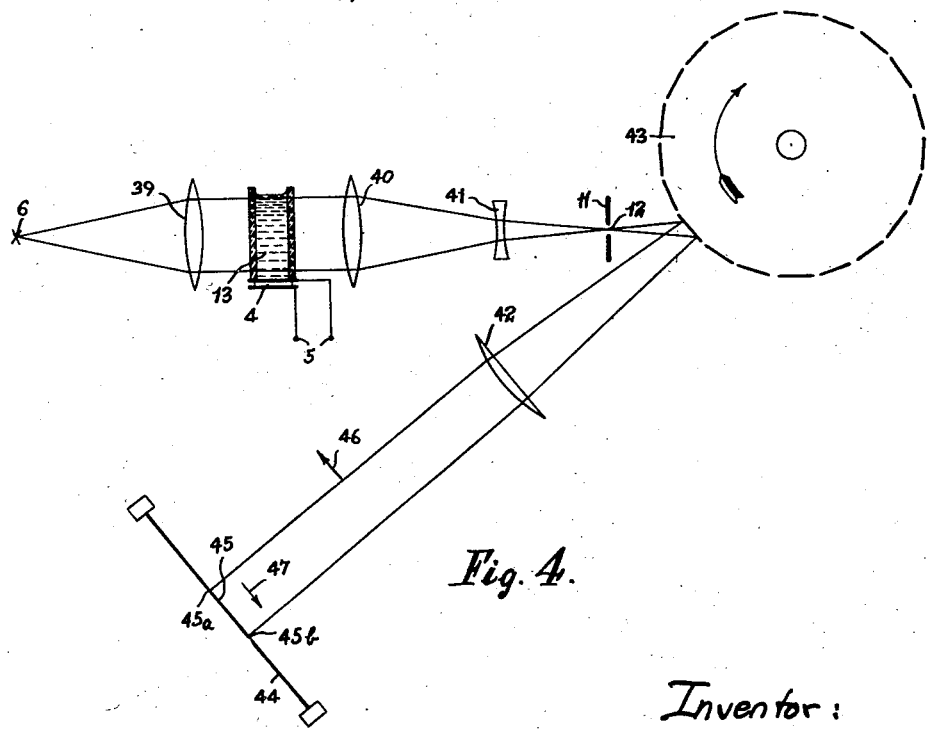

The invention wil be described by way of example with reference to the accompanying diagrammatic drawings, in which Fig. 1 represents in sectional elevation one form of light modulator to which the invention is applicable, Figs. 2 and 3 show diagrammatically an optical system using the apparatus illustrated in Fig. 1, Fig. 2 being a side view and Fig. 3 being a view in plan of the system, Fig. 4 shows in side view the application of the apparatus of Figs. 2 and 3, to a television receiving system according to the invention.

Figure 8:
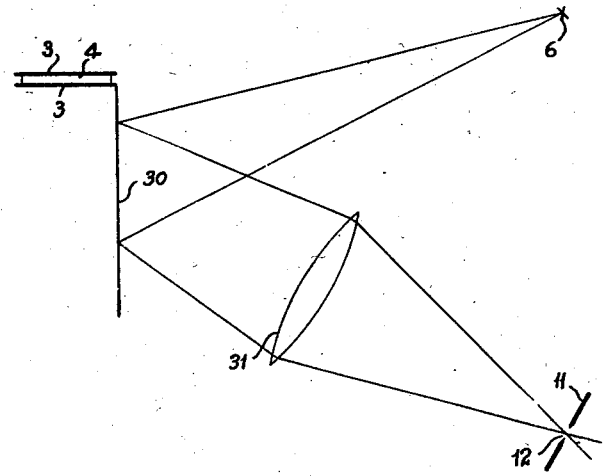
Figure 9:
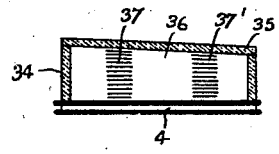
Figure 10:
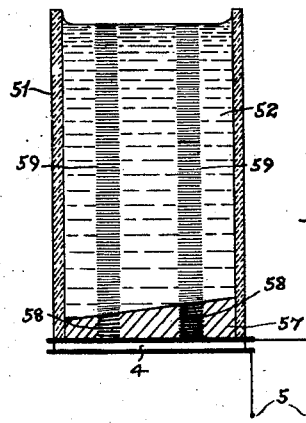

Figs. 5, 6, 7 and 8 show in side views modifications of part or parts of the apparatus shown in Figs. 2 and 3, Fig. 9 is an explanatory figure, Fig. 10 represents in section a modification of the apparatus shown in Fig. 1.

Figure 13:
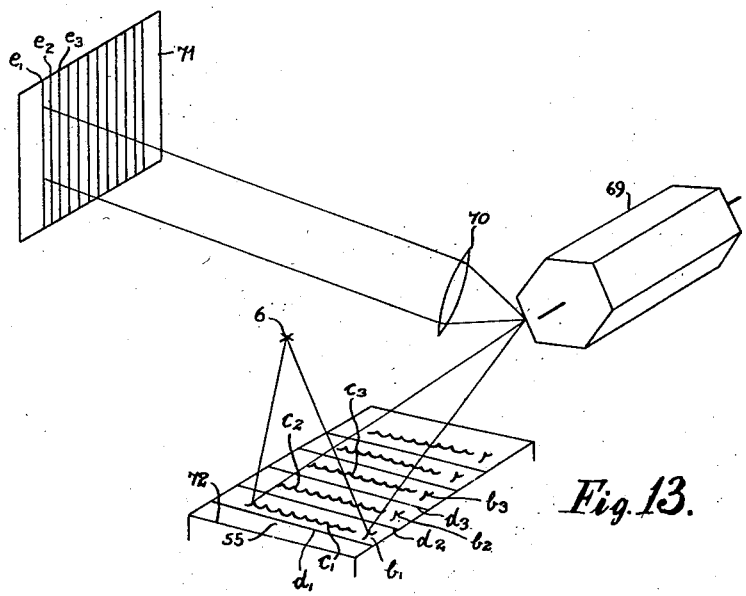
Figure 14:
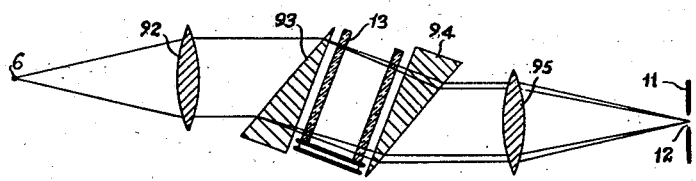
Figure 15:
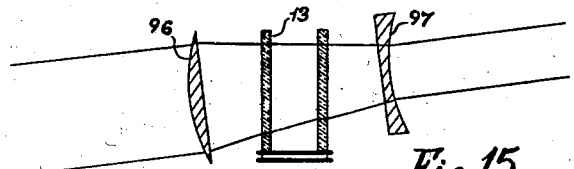
Figure 11:
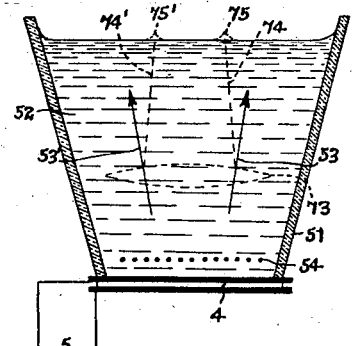
Figure 12:
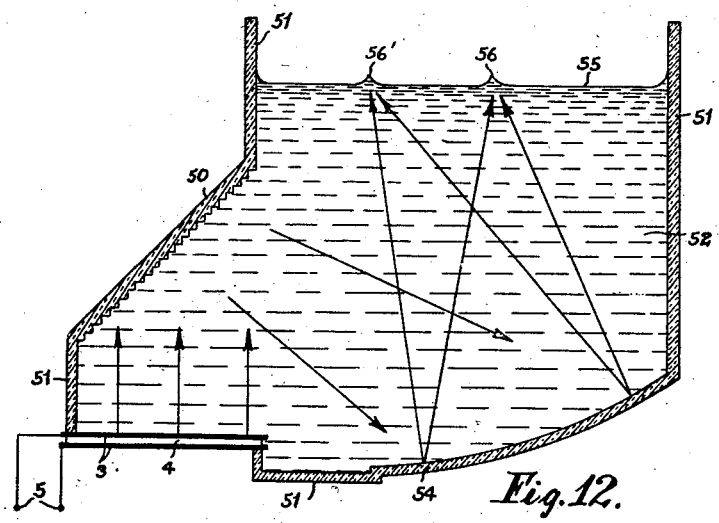

Figs. 11 and 12 represent in section further modified forms of the apparatus illustrated in Fig. 1, Fig. 13 shows the application of apparatus such as that of Figs. 11 and 12 for a television receiver and, Figs. 14 and 15 show in part sectional side view two forms of optical correcting systems for use with devices according to the present invention.

Referring now to the drawings, Fig. 1 shows a cell of known kind, in which modulated mechanical waves may be produced for the purpose of light modulation. A vessel 13 has walls 1 of glass or similar transparent material, and a base of metallic layers 3 between which is held by suitable means a piezo-electric crystal 4. Thus the crystal may be a thin quartz plate cut perpendicular to its electric axis, having each face coated with aluminium foil, or gilded. The vessel 13 contains a transparent liquid 2 such as water or paraffin oil. If high frequency electrical oscillations are applied across the terminals 5 which are connected to the metallic plates 3, the piezo-electric crystal 4 will vibrate mechanically in sympathy with the applied electrical oscillations. These vibrations will pass into the liquid 2, and a series of compressional waves, of intensity corresponding to the magnitude of the electric oscillations on the plates 3, will move up the vessel at a speed depending on the nature of the liquid contained therein. If the mechanical waves are modulated in amplitude by modulating the high frequency potential applied across the terminals 5, the intensity of the compressions and rarefactions will be correspondingly changed. If now a light beam is passed through the cell in a direction substantially parallel to the major surfaces of the crystal 4, that is substantially at right angles to the direction of propagation of the waves in the liquid 2, and if either the central or outer portions of the emergent beam are selected, the resulting beam will change in intensity in accordance with the applied modulations.

Figs. 2 and 3 show diagrammatically an optical system for use with the cell 13 shown in Fig. 1. Light from a source 6, preferably longer in the plane of Fig. 3 than in that of Fig. 2 passes through the cylindrical lens 7 and the spherical lens 8 and thence through the cell 13; the spherical lens 9 and the cylindrical lens 10 in conjunction with the cell 13 itself (acting as a cylindrical lens) serve to form an image of the source 6 on the aperture 12 of the diaphragm 11. The cell 13 may be of other than circular cross-sectional area. In cases where it has a rectangular cross-section for example, it will clearly have no focusing effect on the beam. The aperture 12 may be elongated in the same direction as the light source 6.

The beam of light passing through the aperture 12 is modulated in accordance with the modulations of the mechanical waves propagating through the cell 13, the diffraction spectra produced by the waves in the liquid 2 being arrested by the diaphragm 11.

The lenses 7 and 10 may be omitted if desired. It is, however, not usually practicable to construct a cell of large dimensions, the chief restriction being in the direction of its cross-sectional area as indicated in Fig. 3. It is on order that this restriction should not materially lessen the amount of light available, that the cylindrical lenses 7 and 10 of Figs. 2 and 3 are used in this example. They serve to produce an increased condensation of the light in the plane of Fig. 3. In the plane of Fig. 2 it is however advantageous to have the cell long (for reasons which will be brought forward later) and extra condensing power in this plane, beyond that given by the spherical lenses 8 and 9, is not usually required.

The present invention utilises the fact that the mechanical waves which cause diffraction effects travel with a finite velocity along the body in which they act. If, therefore, this body be long enough in the direction of travel and if the waves be modulated in intensity sufficiently quickly, there may be present, at any moment, regions of different intensity of modulation in different parts of the body, these regions themselves moving at about the speed of propagation of the waves. If it be desired to apply simultaneously to a given spot all the light controlled by the device, this fact may limit the permissible length of wave-bearing body that can usefully be employed since, as already stated, it is then necessary that the width of the light beam, in the direction of travel of the mechanical waves, should be less than the wave length, in the body, of the highest modulation frequency. In cases, however, where the effective position of application of the controlled light is required to change with time, as for example in the production of a television picture by scanning, this above mentioned fact permits of advantageous application as will be described with reference to Fig. 4.

Fig. 4 shows an example of television apparatus, according to the present invention, in which the form of modulating device shown in Fig. 1 is used. Here 6 is a light source, light from which is rendered parallel by the lens 39 and then passes through the modulating device 13, wherein mechanical waves are produced by the piezo-electric crystal 4. To produce the mechanical waves there is fed to the terminals 5 a carrier wave modulated with picture signals to be reproduced. The mechanical carrier waves so produced in the liquid of the device 13 are similarly modulated. The mechanical waves can thus be regarded as made of a series of wave groups, each group having the carrier frequency and an amplitude dependent upon the brightness of the particular elemental area of the transmitted picture represented thereby. The converging lens 40 together with the negative lens 41 produce an enlarged image of the light source upon the slit 12 in the diaphragm 11 which serves to select the controlled portion of the light. After passing this slit, the light falls on to the mirror drum 43 rotating clockwise in the figure, and after reflection therefrom is focused upon the screen 44 by a lens 42. The mirror drum 43 may be of the type comprising a series of mirrors at progressively increasing angles to the drum axis. Any other suitable form of scanning device can, however, be used instead of the mirror drum. The image 45 upon the screen 44 is an image of the modulating device 13, and the optical system is so proportioned in relation to the speed of rotation of the drum 43 that while this image 45 as a whole sweeps the screen with a certain velocity in a direction indicated by the arrow 46, the images within it of the wave groups in the modulating device 13 (each representing the brightness of one elemental area of the picture) move with equal velocity in the opposite direction as indicated by the arrow 47 and therefore remain stationary on the screen.

Thus when a high frequency carrier oscillation modulated with television picture signals is applied to terminals 5, at one instant of time the amplitude of the compressional wave close to the bottom of the cell 13 will represent the brightness of the picture element which has to be reproduced at point 45a upon the screen 44. At the same moment, however, the amplitude of the compressional wave near the top of the cell 13 will represent the brightness of an element 45b located before the element 45a in the direction of scanning. The brightness of the elemental images 45a and 45b will correspond to the amplitudes of the compression waves at the bottom and top respectively of the cell and will, if the optical system be suitably arranged, be correctly related to corresponding elemental areas at the transmitter. When the wave which was, at the instant above considered, at the bottom of the cell 13 (producing image 45a) has reached the top of the cell, the scanning drum 43 will have moved the light beam so that the image of the wave is still formed at the point 45a. Thus instead of reproducing only a single elemental area at a time upon the screen 44, a number of such areas can be reproduced simultaneously from signals received along a single channel, thus increasing the optical efficiency of the reproducer.

The degree of definition obtainable on the screen in the direction of the scanning motion thus depends not on the length of the light spot as a whole, but simply on the accuracy of definition of the wave group images. In this way the liquid column along which the waves travel may be made of any desired length, in order to increase the resultant average illumination on the screen without loss of definition.

The reasons for focusing an image of the waves in the cell 13 upon the screen 44 and immobilising the image, will now be apparent. If, for example, at any instant, the carrier wave fed to terminals 5, is modulated at a frequency of $10^5$ cycles per second, say, and if there are at this instant 10 complete cycles of waves of the modulation frequency in the cell 13, there will be no net variation in light intensity on the screen 44 with the drum 43 at rest. When the drum 43 is rotated at the appropriate speed, however, the image of the $10^5$ cycle wave will be immobilised on the screen and the result will be 10 bright strips or dots interspersed with 10 dark strips or dots. In cases, where use can be made of this effect, therefore, as in television, the effect of the focusing and immobilising of wave images at 44 is to permit the use of a wave-bearing body 13 long enough to accommodate a plurality of waves of the modulation frequency and thus to enhance the optical efficiency.

Figures 5, 7:
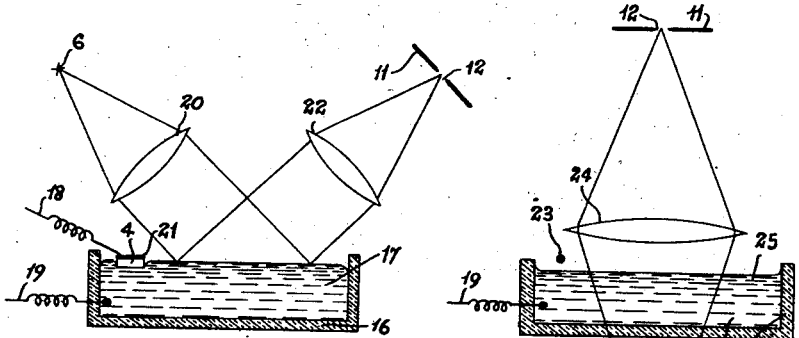

In Figs. 5 to 8 are shown optical systems using novel forms of light modulator which may be used instead of that shown in Fig. 1. In the arrangement of Fig. 5, a suitable quantity of mercury 17 in a vessel 16 has waves produced on its surface by oscillation of the piezo-electric crystal 4 which floats on the mercury, and across which high frequency oscillations are impressed by the lead 18 connected to a metallic coating 21, and a lead 19, which is in contact with the mercury 17, through the wall of the vessel 16. The mercury acts as the other metallic facing of the crystal. Light from the source 6 is rendered parallel by the lens 20 and reflected from the surface of the mercury through the lens 22 which focuses an image of the source 6 on to the aperture 12 of the diaphragm 11. The waves on the surface of the mercury act in a similar manner to a normal reflecting diffraction grating, and produce scatering of the reflected beam, the amount of scattering being dependent upon the amplitude of the waves. The diffracted light is arrested by the diaphragm 11 and the modulated beam passes through the aperture 12 therein.

In Fig. 6 is shown an alternative method of producing waves on the surface of a liquid, by the electrostatic attraction between the liquid 17 and a wire 23 running parallel to the surface of the liquid 17, and fixed a short distance above the surface. The high frequency oscillations are applied to the wires 19 and 23, and owing to alternating electrostatic attraction the liquid 17 and the wire 23, waves are formed on the surface of the liquid 17. The optical arrangements used with this form of modulation device may be similar to those shown in Fig. 5.

In Fig. 7 is shown a modification of Fig. 6, where a transparent liquid 17 is used, the base of the vessel 16 also being of transparent material. Light, instead of being reflected from the surface of the liquid, is passed through it. High frequency alternating potentials are applied across the wires 19 and 23, as in the case illustrated in Fig. 6, whereby waves are produced on the surface 25 of the liquid 17. Light from the source 6 passes up through the liquid, and the diffraction effects take place at the upper surface 25 of the liquid 17. The light is focused by the lens 24 on to the aperture 12 of the diaphragm 11.

In Fig. 8 is shown yet another method whereby modulation of a beam may be brought about by the formation of waves in its path. A thin silvered mica plate 30 has fixed to it at one edge a piezo-electric crystal 4, covered by metal plates or layers of gilding 3, these layers lying perpendicular to the electric axis of the crystal. Modulated high frequency potentials applied to the plates 3 produce in the crystal 4 vibrations which set up flexural waves in the plate 30. Light from a source 6 reflected from the plate 30 is collected by the lens 31 and focused on to the aperture 12 of the diaphragm 11. The flexural waves in the plate 30 cause diffraction effects in the beam of light from the source 6 in a manner similar to that of the preceding examples.

The waves may of course be produced otherwise than by means of the piezo-electric or electrostatic means so far as described. For example waves either flexural or compressional, may be produced by mechanical means, e. g., by a vibrating tuning fork or similar device, or by an electromagnetically operated diaphragm. Waves may also be produced by a metal rod vibrating in sympathy with electromagnetic impulses, or by virtue of its magnetostrictive properties, or by electrolytic means, for example, by alternate polarisation and depolarisation at an electrode immersed in a conducting solution when high frequency currents flow from it through the solution. It will be understood that the invention is not limited to the specific examples cited above, but that these examples serve to show how mechanical vibrations produced in a body located in an optical system may serve to produce modulation of a light beam according to the modulation of said waves. The wave bearing body, may, if desired, be in the form of a transparent solid or gas.

In applying the invention as more fully discussed in my application Serial No. 8,451, use may be made of reflections of the mechanical waves from boundaries of the wave bearing body, or from barriers or irregularities of any suitable kind introduced therein, to attain any desired resonances or localisations of intensity of the waves with consequent enhancements or localisations of their optical effects.

In Fig. 9 there is shown by way of explanation a device which resonance effects may be obtained to separate two or more sets of modulated high frequency carrier waves applied to the modulator. In a liquid cell 34 a boundary surface or line 35 may be provided inclined to the surface or line of origin 4 of the waves, whereby repeated reflections of the waves between this boundary and their origin produce a region or regions of resonance 37, 37', whose position may depend on the frequency of the mechanical waves. In this case two or more electrical frequencies may be applied simultaneously to the quartz crystal 4, or other wave-originating members, resulting in two or more corresponding distinct regions of effect in the wave-bearing body, so that the wave amplitudes in particular regions, and thereby the corresponding optical effects, may be modulated or controlled independently of those in other regions by modulating the appropriate electrical frequency or frequencies applied to the device. Thus the region 37 may correspond to one applied frequency and the region 37' to another.

Alternatively, barrier surfaces or lines of suitable material may be inserted in the wave bearing body at suitable intervals, either parallel or inclined to the surface or line of wave origin and/or to each other, whereby interference or resonance effects of the waves may be obtained resulting in localities of resonance as in the previous example.

Further, the wave-bearing body may have one or more boundaries or inserted barriers of periodic form, for example stepped boundaries or barriers having regular apertures or variations of thickness, whereby the waves are diffracted in directions dependent upon their frequency. Such boundaries or barriers may if desired be curved, whereby a focusing effect may be attained resulting in the localisation in the body of regions of effect dependent upon frequency.

Examples of how the above principles may be applied to the present invention are shown in Figs. 10 to 12.

In Fig. 10 a vessel 51 containing a liquid has a bottom constituted by a piezo-electric crystal 4 and a wedge-shaped block 57. If the crystal is made to vibrate by applying high frequency potentials to the terminals 5, compressional waves will be formed in the block 57. Owing to its wedge-shaped form, points of resonance 58 will be set up, at places where the depth of the block is an integral number of wavelengths, in the manner described in connection with Fig. 9. These points of resonance 58 will set up in the liquid 52 wave trains 59 of corresponding wavelengths. The block 57 may for example be of steel or it may be replaced by mercury. In the latter case the vessel 51 would have to be tilted out of the vertical in order to give the mercury layer the necessary wedge-shape.

In Fig. 11 a vessel 51 containing a liquid 52, and having fixed at the bottom a piezo-electric crystal 4, has in it a grating 54, consisting of a number of fine wires stretched parallel to one another and spaced apart by distances of the order of the wavelengths of the waves to be transmitted in the liquid. This grating 54 will produce diffraction of the mechanical waves in the liquid 52 and waves of different frequencies will travel in different directions. Thus two high frequency potentials of different periodicity applied to the terminals 5 will give rise to two sets of waves in the liquid 52, travelling for example in the directions indicated by the arrows 53 and 53'.

If desired a lens 73, which may for example be of fused silica, indicated by the dotted lines, may be provided to focus the mechanical waves at desired points for example as indicated by the dotted lines 74 and 74' at points 75 and 75' on the surface of the liquid.

One way in which such an arrangement or one of the kind shown in Fig. 12, can be made use of will be described later with reference to Fig. 13.

In Fig. 12 a piezo-electric crystal 4 forms part of the wall of a vessel 51; waves produced in the liquid 52 by the crystal 4 vibrating in sympathy with high frequency potentials applied to the terminals 5 are diffracted by the ridged plate 50, and are then reflected from the curved boundary 54 of the vessel 51, the curvature being such as to bring the waves to a focus at the point 56 on the surface 55 of the liquid 52. As the plate 50 has a different diffracting power for different wavelengths of compressional waves, the position of the focus on the liquid surface 55 is different for each set of wavelengths. In this way if two sets of high frequency potentials of different periodicity are applied to the terminals 5, the positions of resonance on the surface 55 of the liquid 52 will be different for each set of waves as indicated at 56 and 56'. Such positions of resonance may be used to modulate a light beam in the manner described above (for example in connection with Figs. 5 to 7) in accordance with modulations of the high frequency oscillations applied to terminals 5.

Devices as have been described in connection with Figs. 9 to 12 in which there are produced regions of resonance dependent for their position upon the frequency of the applied oscillations, may be used to produce simultaneously two or more modulated beams of light, the modulations being independent of one another.

Any of the forms of modulating device described above may be used in connection with the apparatus of Fig. 4. In the cases illustrated in Figs. 5 to 7, 11 and 12 however, the frequencies suitable for producing ripples on the liquid surface are in general lower than those suitable for compressional waves in the liquid. In these cases the high frequency potentials of different periodicities (say $F_1$, $F_2$, etc.), whose application to the piezo-electric crystal results in regions of resonance on the liquid surface may be modulated not only with the modulation frequencies to be converted into light variations, say $M_1$, $M_2$ respectively, but also at a lower frequency (say $f$) appropriate to the generation of ripples on the liquid surface.

The mode of generation of ripples is then as follows:

At each point (for instance 56, 56' of Fig. 12) on the liquid surface where a resonance is focused, the concentration of high frequency energy results in an upward pressure on the liquid surface. Owing to the modulation of the high frequencies $F_1$, $F_2$, etc., by a lower frequency $f$ appropriate to ripple formation, this pressure varies at the said lower frequency $f$, giving rise to ripples or waves on the liquid surface which may be applied to light modulation in the manner previously described (for example in connection with Figs. 5 to 7). The further modulation of $F_1$ and $F_2$ at frequencies $M_1$, $M_2$ which are lower than the ripple frequency, will then give rise to modulation of corresponding sets of ripples on the liquid surface and thereby of the corresponding light intensities in accordance with the television or like signals of frequencies $M_1$, $M_2$.

Fig. 13 illustrates the application of the principle outlined above to television.

On the surface 55 of a light modulating device 72 (for example that illustrated in Fig. 12) are produced a series of resonance points $b_1$, $b_2$, $b_3$ ... etc. Such resonance points are produced in the manner described in connection with Fig. 12 by applying to the terminals 5 of Fig. 12 a set of modulated high frequency potentials $F_1$, $F_2$ etc. Each of the frequencies $F_1$, $F_2$, etc., is modulated with picture signals corresponding to picture elements in one line of the object. Each set of modulated line signals $F_1$, $F_2$, etc., is therefore characterised by a different carrier frequency. In the present case the high frequency potentials $F_1$, $F_2$, etc., may also be modulated, as indicated above, by a frequency $f$, the result of which will be to cause a train of ripples, indicated at $c_1$, $c_2$, $c_3$, etc., in Fig. 13 to emanate from the resonance points $b_1$, $b_2$, $b_3$ etc. These trains of ripples are prevented from interfering with one another by barriers $d_1$, $d_2$, $d_3$, etc., placed in the surface 55 of the liquid parallel to the direction of the ripple trains.

Light from a source 6 is allowed to fall on the surface 55 of the liquid in the modulating device 72. It is modulated, in the manner described with reference to Fig. 5, by diffraction from the wave trains $c_1$, $c_2$, $c_3$, etc., and a part of the beam is selected as previously described, although the selecting means are omitted from Fig. 13 for the sake of clearness. The light then falls on the scanning mirror drum 69, and an image of the surface 55 is focused by the lens system illustrated diagrammatically at 70 on to the screen 71. In this way there can be formed on the screen 71 lines of light each corresponding to the lines or parts of the lines of the object. The intensities of the lines will be varied by the corresponding picture signals and the lines will be swept over the screen 71 by the scanning drum 69, the speed of the scanning drum being such that the wave images are immobilised on the screen for the period of its presentation in spite of the scanning motion of the light as a whole.

If the number of elements so presented in each line be equal to the total length of the line, and if all the lines of the picture be simultaneously transmitted as described, each line having a different carrier frequency, the whole picture will be continuously projected upon the receiver screen. Flicker is thus eliminated, and a lower rate of picture repitition than is usually used when flicker has to be overcome by rapid repitition will suffice for the proper presentation of motion.

In the above example it is possible to omit the barriers $d_1$, $d_2$, $d_3$, etc., by making the length of the line joining the resonance regions $b_1$, $b_2$, $b_3$, etc., so great that each resonance region is long in this direction in comparison with the wavelength of the ripples.

There is thus formed by each resonance region a plane wave front of ripples of sufficient width to ensure approximately rectilinear propagation of the ripples.

The above is given merely by way of illustration of the many ways in which such devices may be utilised. It is not necessary that the whole of a television picture be presented simultaneously as above described, for it may often be convenient merely to present a fraction of the total number of lines simultaneously and then to pass on in the scanning motion to the next group of lines.

The scanning devices used in such applications of the invention as are described above may be of any suitable type. In cases where all the lines of the picture are scanned simultaneously, a convenient form of scanner is a simple mirror drum, with all the mirrors parallel to the axis. Where only a fraction of the total number of lines is simultaneously scanned, mirror drums may be used having mirrors with progressively different inclinations to the axis, so that each set of lines, in turn, may be projected in its appropriate position on the receiver screen.

Thus devices according to the present invention, or combinations of them, may be used in television to translate into a picture a television signal comprising several high frequency components simultaneously present, each modulated in accordance with impulses representing the light distribution of a particular line or part of the scene transmitted. These devices may also be employed in any cases where it is required to form a line or pattern of light having intensities in particular parts corresponding to the intensities of particular frequency components in a complex signal.

It will be understood that in arrangements as described with reference to Fig. 9 standing waves are desired and the boundary 35 should be of wave reflectory material. The same applies to the body 57 in Fig. 10.

In other cases means may be used to prevent or diminish effects whereby undesired standing waves might be produced as a result of reflection of the mechanical waves from boundaries of the wave-bearing body. Such means may for example comprise boundaries of the body so shaped that the reflected waves proceed in directions such that their optical effects are negligible with respect to the particular light beams used. Alternatively, means for damping the reflected waves may be provided, such as boundaries or barriers of materials of suitable physical characteristics. For example, in the case of a liquid along which compressional waves are propagated, a cork boundary may be placed in their path at a suitable distance from their source. Alternatively, the length of the wave-bearing body may be such that the natural damping of the waves during their passage along or through it suffices to reduce to negligible amplitude any reflected waves which might otherwise produce undesirable effects.

Since in general the optical effects produced by the mechanical waves in this invention vary with the colour of the light employed, and since in many cases they vary also with the direction of incidence of the light on the wave-bearing body, the optical systems used with this invention in any of its forms may be so arranged that the spectral components of the colours of shorter wavelength (e. g., blue) which are most affected are incident upon the wave-bearing body at a different angle from those components of longer wavelength (e. g., red) which are less affected so that the inherent variation of effect on different colours is neutralised or reduced by variation in their angles of incidence. For example in the simple case of a liquid or solid wave-bearing body, as described in Fig. 1, the maximum effect is obtained when the light passes through the body in a direction parallel to the mechanical wave front. To secure the compensating effect described, the red components may be made to pass most nearly in this direction, and other spectral components, in order, may be given directions of increasing deviation from it. One optical arrangement to secure this effect is shown in Fig. 14, which shows a pair of similar dispersing prisms of flint glass 93, 94 arranged one on each side of the wave-bearing body 13, so that the prism 93 on the incident side introduces a suitable degree of dispersion in the beam of light before its passage through the wave-bearing body, this dispersion being neutralised afterwards by the second prism 94. If desired, the prisms may be in optical contact with the body. With suitable modifications, such a system may be used in conjunction with any of the modulating devices of the present invention.

In an analogous way correction may be obtained for the variation in optical effect along the length of the wave-bearing body due to damping of the waves as they proceed along it, or in some cases due to variation in the effective area of the wave front. In the case of damping, the optical effect is inherently greater near the origin of the waves than at a distance from it. The optical arrangement may then be such that at the point of greatest wave amplitude the direction of incidence of the light is inclined to that giving maximum optical effect and that this inclination is progressively reduced for the regions of decreasing amplitude. In simple cases first described, where the waves are produced in liquid or solid bodies, the direction of maximum effect is usually constant throughout the length of the wave-bearing body. The compensating effect described is then attainable by using a light beam which is slightly divergent or convergent and incident on the wave-bearing body at an angle to the normal so that in the region of maximum wave amplitude the direction of its rays is more inclined to the mechanical wave front than in the region of minimum amplitude. This compensating effect can be brought about simply by focusing and is most conveniently incorporated in the whole associated optical system, by using lenses of appropriate powers. If it is desired, however, to work with parallel beams, it may be attained in the manner shown in Fig. 15, where there is provided on one side of the body 13 a lens 96 of positive power and on the other side a lens of slightly greater negative power 97, a parallel beam of light being directed upon the combination at a suitable angle. The beam will then be rendered convergent by the lens 96 during its passage through the wave-bearing body, and parallel again afterwards by the lens 97. Clearly by exchanging the positions of the lenses 96 and 97 the beam may be made divergent within the body 13.

The above described correction for damping effects and that previously described for making the system achromatic, may be applied together in the device if desired, either in the forms described or in any other suitable way, according to conditions.

Clearly in all cases described above instead of selecting the central part of the beam by an apertured diagrahm 11, the outer part of the beam may be used if desired. For this purpose the diaphragm is arranged to stop off the central part of the beam and allow the outer part to pass on to the utilisation point. Both the central and the outer portions can be used separately, if desired, since both are modulated. Since the modulation is in opposition the two portions cannot be used together.

I claim:

1. Apparatus for producing an optical image of a plurality of applied variations on an image plane, comprising a body capable of transmitting mechanical waves to produce diffraction grating effects, said body to be arranged in the path of a light beam so that the direction of said mechanical waves traversing said body is inclined relatively to said path, means for applying to said body a mechanical carrier oscillation modulated with said variations to cause a plurality of corresponding wave groups to traverse said body simultaneously, thereby diffracting part of a light beam when directed upon said body, optical means for separating the diffracted from the undiffracted part of such light when emerging from said body, means for focusing one such separated part to form an optical image of said plurality of mechanical waves simultaneously traversing said body upon an image plane, and means for rendering said image stationary.

2. Apparatus for modulating a light beam in accordance with applied variations, comprising a reproducing screen, a body capable of transmitting mechanical waves to produce diffraction grating effects, said body being capable of being arranged in the path of said light beam, means for applying to said body a mechanical carrier oscillation modulated with said variations to cause a plurality of corresponding mechanical wave groups to traverse simultaneously said body in a direction inclined relatively to the direction of said path, thereby diffracting a part of said light beam when directed upon said body, optical separating means for separating said diffracted part from the undiffracted part of said beam when emerging from said body, means for focusing one of said parts to form an image of said wave groups upon said screen, and means for rendering said image stationary relatively to said screen.

3. Apparatus for modulating a light beam in accordance with applied variations, comprising a light source, a reproducing screen, a body capable of transmitting mechanical waves to produce diffraction grating effects, said body arranged in the path of light from said source, means for applying to said body a mechanical carrier oscillation modulated with said variations to cause a plurality of corresponding mechanical wave groups to traverse said body simultaneously in a direction inclined relatively to the direction of said path, thereby diffracting a part of said light emerging from said body while another part remains undiffracted, optical means for separating said diffracted part from the undiffracted part, means for focusing an image of said light source in the neighborhood of said separating means, means for focusing one of said parts of emerging light to form an image of said wave groups simultaneously traversing said body upon said screen, and means for rendering said image stationary relatively to said screen.

4. A method of producing an optical image of applied variations on an image plane, comprising the steps of applying a mechanical carrier oscillation modulated with said variations to a body capable of transmitting mechanical waves to produce diffraction grating effects, thereby causing a plurality of mechanical wave groups corresponding to said variations to traverse said body simultaneously; directing a light beam upon said body while traversed by said mechanical waves, thereby diffracting part of said light while leaving another part undiffracted; separating the diffracted from the undiffracted part of said light emerging from said body; focusing one such separated part upon an image plane to form an optical image of said plurality of mechanical wave groups traversing said body; and rendering said image stationary.

5. Television receiving apparatus comprising a light source, a stationary reproducing screen, a body capable of transmitting mechanical waves to produce diffraction grating effects arranged in the path of light from said source, means for applying to said body a carrier oscillation modulated with received television signals to cause a plurality of corresponding mechanical wave groups to traverse said body simultaneously in a direction inclined relatively to the direction of said path, a part of the light emergent from said body being diffracted by said mechanical wave groups, optical separating means for separating said diffracted part from the undiffracted part of said emergent light, means for focusing one of said parts of said emergent light to form an image of said wave groups upon said screen, and scanning means for rendering the images of said wave groups stationary upon said screen whereby said plurality of wave groups, each representative of the brightness of one elemental area of the transmitted picture, are caused to be operative simultaneously in reconstituting on said screen image of a plurality of elemental areas of the picture.

6. Television receiving apparatus for reconstituting simultaneously a plurality of elemental areas of a transmitted picture in each of a plurality of different sections of the picture, comprising a light source, a stationary reproducing screen, a body capable of transmitting mechanical waves to produce diffraction grating effects, arranged in the path of light from said source, means for applying to said body a plurality of mechanical carrier oscillations of different frequencies, each representative of the brightness of elemental areas in a different section of the picture and each causing a plurality of mechanical wave groups, each representative of an elemental area of the picture, to traverse said body simultaneously in a direction inclined relatively to the direction of said path, said mechanical carrier oscillations being caused to traverse said body along spacially separated paths, a part of the light emergent from said body being diffracted by said wave groups, optical separating means for separating said diffracted part from the undiffracted part of said emergent light, means for focusing one of said parts of said emergent light to form an image of said wave groups upon said screen, and a scanning device for sweeping said emergent light over said screen at such a speed as to render stationary simultaneously the images of said plurality of wave groups in all of said sections of the picture.

JOHN HENRY JEFFREE.